United States Patent [19]

Saita et al.

[11] Patent Number: 4,556,501
[45] Date of Patent: Dec. 3, 1985

[54] HEAT STORAGE COMPOSITION

[75] Inventors: Kenji Saita, Niihama; Syozo Fujioka, Toyo, both of Japan

[73] Assignee: Sumitomo Chemical Company, Limited, Osaka, Japan

[21] Appl. No.: 659,883

[22] Filed: Oct. 11, 1984

[30] Foreign Application Priority Data

Oct. 13, 1983 [JP] Japan ................................ 58-192020
Jun. 8, 1984 [JP] Japan ................................ 59-118738

[51] Int. Cl.$^4$ .............................................. C09K 5/06
[52] U.S. Cl. ........................................ 252/70; 126/400
[58] Field of Search ............................................ 252/70

[56] References Cited

U.S. PATENT DOCUMENTS

| | | | |
|---|---|---|---|
| 2,677,664 | 5/1954 | Telkes | 252/70 |
| 4,277,357 | 7/1981 | Boardman | 252/70 |
| 4,415,465 | 11/1983 | Koike et al. | 252/70 |

FOREIGN PATENT DOCUMENTS

| | | | |
|---|---|---|---|
| EP11411 | 5/1980 | European Pat. Off. | 252/70 |
| 51-96788 | 8/1976 | Japan | 252/70 |

Primary Examiner—Paul Lieberman
Assistant Examiner—Robert A. Wax
Attorney, Agent, or Firm—Stevens, Davis, Miller & Mosher

[57] ABSTRACT

A heat storage composition comprising sodium sulfate decahydrate as main component, a supercooling inhibitor, and a solid-liquid separation inhibitor, characterized in that hydraulic calcium sulfate and/or calcium sulfate dihydrate is contained as the solid-liquid separation inhibitor in an amount of 2-15% by weight based on the whole weight of the composition, whereby the solid-liquid separation, i.e. the sedimentation of the anhydrous sodium sulfate during the phase transition, is effectively prevented and the long-term stability is improved. The long-term stability of the composition can be more improved by addition of a silica series of thickener.

4 Claims, No Drawings

HEAT STORAGE COMPOSITION

BACKGROUND OF THE INVENTION

1. Field of the Invention

The present invention relates to a heat storage composition superior in long-term stability, which is composed mainly of sodium sulfate decahydrate. More particularly, the invention relates to a heat storage composition characterized by additionally containing calcium sulfate as a solid-liquid separation inhibitor.

2. Description of the Prior Art

There has long been known the concept that thermal energy is stored and reproduced by utilizing the absorption and release of heat due to change in phase of a hydrate salt compound between fusion and solidification. According to results of studies reported up to now, it is pointed out that two problems arise when this method for heat storage is reduced into practical use. The first problem is that hydrate salts often show a so-called supercooling phenomenon without undergoing the phase transition of fusion or solidification at the respective fusion points or freezing points. Accordingly such supercooling needs to be prevented in order to cause the phase transition at a definite temperature. For example, U.S. Pat. No. 2,677,664 describes a method for preventing such supercooling which comprises addition of borax ($Na_2B_4O_7 \cdot 10H_2O$) as a supercooling inhibitor for $Na_2SO_4 \cdot 10H_2O$. Crystals of $Na_2B_4O_7 \cdot 10H_2O$ are reported to be in epitaxial relation with crystals of $Na_2SO_4 \cdot 10H_2O$ and when contained in a supersaturated solution of $Na_2SO_4 \cdot 10H_2O$, promote the crystallization of $Na_2SO_4 \cdot 10H_2O$, thus preventing the supercooling effectively (Industrial and Engineering Chemistry, Vol. 44, pp. 1308-1310 (1952)). The use of $Ba(OH)_2$ or $Ba(OH)_2 \cdot 8H_2O$ (Japanese Patent Publication No. 9596/1978) and the use of $BaI_2$ or $BaSO_4$ (Japanese Patent Application Laid-Open No. 102675/1980) are also known as methods for preventing the supercooling of $CaCl_2 \cdot 6H_2O$.

The second problem is the occurrence of a solid-liquid separation phenomenon, that is, the sedimentation of an anhydrous salt during the phase transition of the hydrate salt thereof. For example, $Na_2SO_4 \cdot 10H_2O$ is decomposed at 32.4° C. to form an anhydrous salt thereof and this anhydrous salt settles on the bottom. On cooling to a temperature below 32.4° C., the anhydrous salt is recombined with water to become $Na_2SO_4 \cdot 10H_2O$. However, crystals of $Na_2SO_4 \cdot 10H_2O$ cover the surface and hence the lower part of the anhydrous salt is inhibited from the water recombination, thus producing floating water, i.e., bleeding. Therefore, the anhydrous salt needs to be prevented from the sedimentation. In general a solid-liquid separation inhibitor is used for the purpose of preventing the sedimentation. In this case, the long-term stability of the resulting heat storage composition should be satisfied. The use of an organic material such as natural rubber or a synthetic high polymer as the solid-liquid separation inhibitor is undesirable since these organic materials can be gradually hydrolyzed or attacked by microorganisms to decomposition. The use of inorganic materials has been proposed such as a porous support (Japanese Patent Publication No. 6108/1978), a clay type of material having lath-like particles for providing a thixotropic property (Japanese Patent Application Laid-Open No. 34687/1978), and a superfine powder of anhydrous silicic acid ($SiO_2$) (Chemical Week, Mar. 1, 1978, p. 34). However, the use of these inorganic materials tends to result in a gradual reduction of the viscosity of the heat storage composition and leads to the solid-liquid separation during repetition of the heat absorption-radiation cycle for a long time, so that the ability thereof to prevent the solid-liquid separation cannot be said to be sufficient. Additionally, some of these inorganic materials are natural products yielding in special teritories and some of these are expensive. Thus, economy becomes an issue when these inorganic materials are practically used, since the original object of heat storage materials is energy conservation.

In view of the present situation noted above, the present inventors made extensive studies on the long-term stability of heat storage materials composed mainly of $Na_2SO_4 \cdot 10H_2O$, and as a result have found that the stability is markedly improved by addition of calcium sulfate as a solid-liquid separation inhibitor to $Na_2SO_4 \cdot 10H_2O$. Based on this finding, the present invention has been accomplished.

SUMMARY OF THE INVENTION

The first object of the invention is to provide a novel heat storage composition which utilizes the phenomenon of absorption and release of heat due to change in phase of a hydrate salt compound.

The second object of the invention is to provide a heat storage composition superior in anti-supercooling property, which is composed mainly of $Na_2SO_4 \cdot 10H_2O$.

The third object of the invention is to provide a heat storage composition composed mainly of $Na_2SO_4 \cdot 10H_2O$, which is improved in the solid-liquid separation inhibiting property and superior in long-term stability.

According to the invention, there is provided a heat storage composition comprising sodium sulfate decahydrate as main component, a supercooling inhibitor, and a solid-liquid separation inhibitor, characterized in that calcium sulfate is contained as the solid-liquid separation inhibitor in an amount of 2 to 15% by weight based on the whole weight of the composition.

DETAILED DESCRIPTION OF PREFERRED EMBODIMENTS

The heat storage composition of the invention comprises sodium sulfate decahydrate as main component, a supercooling inhibitor, and a solid-liquid separation inhibitor and is characterized in that the solid-liquid separation inhibitor is hydraulic calcium sulfate and/or calcium sulfate dihydrate.

The main component sodium sulfate decahydrate termed in the invention consists of $Na_2SO_4 \cdot 10H_2O$ with or without some additional water, and for example, is formed from $Na_2SO_4 \cdot 10H_2O$ or from $Na_2SO_4$ and $H_2O$. The $H_2O/Na_2SO_4$ molar ratio is in the range of 10 to 15. When it is lower than 10, the heat storage capacity will be insufficient because of the lack of the water to be recombined with $Na_2SO_4$. When the ratio is higher than 15, the heat storage capacity will be also insufficient because of the low concentration of $Na_2SO_4$.

The calcium sulfate used as the solid-liquid separation inhibitor, the characteristic of this invention, includes those of hydraulic type such as a hydraulic anhydrous calcium sulfate ($CaSO_4$ of type III) and α-type and β-type of calcium sulfate hemihydrates (α-type and β-type of $CaSO_4 \cdot \frac{1}{2}H_2O$); and those in dihydrate form such as synthetic gypsum and by-product gypsum. Suitable contents of such a calcium sulfate in the heat storage composition are 2–15%, particularly 3–7%, by weight. The content less than 2% by weight is too low for the sufficient formation of the matrix and the effect of preventing the solid-liquid separation is poor. The content more than 15% by weight results in an undesirably low capacity of heat storage because of the decreased concentration of $Na_2SO_4$, though the formation of the matrix is satisfactory.

Hydraulic calcium sulfate in water is hydrated into calcium sulfate dihydrate ($CaSO_4 \cdot 2H_2O$). It is well known that calcium sulfate dihydrate is reacted with sodium sulfate in an aqueous solution thereof to form double salts. For example, "Gypsum" by Michio Sekiya (published by Gihodo Co., Ltd., 1965, p. 104) describes the formation of the following double salts:

$Na_2SO_4 \cdot CaSO_4$, $Na_2SO_4 \cdot CaSO_4 \cdot 4H_2O$, $2Na_2SO_4 \cdot CaSO_4 \cdot 2H_2O$, $Na_2SO_4 \cdot 5CaSO_4 \cdot 3H_2O$ Accordingly, an $Na_2SO_4$—$H_2O$ system on stirring with hydraulic calcium sulfate and/or calcium sulfate dihydrate yields $CaSO_4 \cdot 2H_2O$ and/or the above double salts. The resulting $CaSO_4 \cdot 2H_2O$ and/or the above double salts are in the form of fine acicular crystals. These crystals are entangled and distributed throughout the mixed system to form a matrix. The thus formed matrix exhibits the effect of preventing the solid-liquid separation in the heat storage composition of the invention. In such a mixed system as stated above, considerable time is required for completing the hydration of hydraulic calcium sulfate or for completing the double salt-producing reaction of calcium sulfate dihydrate, because the reaction is completed through the steps of dissolution of calcium sulfate→reaction→crystallization of dihydrate or double salts. Therefore, the stirring needs to be continued from the addition of the hydraulic calcium sulfate and/or calcium sulfate dihydrate to the $Na_2SO_4$—$H_2O$ system until some amounts of dihydrate or double salt crystals appear and the viscosity of the slurry is raised thereby. The sedimentation of the unreacted calcium sulfate is prevented by these partially appearing crystals, and crystals are formed uniformly throughout the system.

It should be noted that the effect of the invention cannot be obtained by dissolving the above double salts in a water-sodium sulfate mixture, since the matrix is not formed thereby.

It is desirable to add a thickener to the heat storage composition of the invention for the purpose of preventing the unreacted calcium sulfate from sedimentation. Suitable thickeners for this purpose include silica thickeners, for example, amorphous silica in fine powder and polysilicic acid. Both the thickeners are effective in raising the viscosity of the $Na_2SO_4$—$H_2O$ system, and preventing the sedimentation of the unreacted calcium sulfate, and additionally have in the themselves the effect of preventing the solid-liquid separation, thus more improving the long-term stability of the composition.

Fine powders of amorphous silica which can be added as desired for the thickening include those produced by the dry process and the wet process, which are well known by the common name of white carbon. These are readily available as sold under the tradenames Aerosil® (Nippon Aerosil Co., Ltd.), Tokusil® (Tokuyama Soda Co., Ltd.), Nipsil® (Nippon Silica Co., Ltd.), and Syloid® (Fuji-Davison Chemical, Ltd.). Suitable contents of the thickener are 0.5–10%, particularly 1–7%, by weight. The content, when less than 0.5% by weight, is too low for exhibiting the thickening effect, and when more than 10% by weight, reduces the heat storage capacity undesirably because of the decreased concentration of $Na_2SO_4$ and raises the cost considerably.

When polysilicic acid is formed by mixing sodium silicate with sulfuric acid, water glass or sodium metasilicate is used for the sodium silicate. Desirably, water glass is used after being diluted with about the same weight of water and the concentration of sulfuric acid used is also lowered. For mixing sodium silicate with sulfuric acid, the way of feeding sodium silicate into surfuric acid is preferred to the way of the reverse feeding since polysilicic acid produced in an acidic medium is superior in thickening effect. Sodium silicate and sulfuric acid are used in such amounts as to be just neutralized and to give a silicic acid concentration in terms of $SiO_2$ lying within the same range as of the above fine powder of amorphous silica, that is, the range of 0.5 to 10% by weight.

Suitable supercooling inhibitors for use in the heat storage composition of the invention include ammonium borate, lithium borate, and borax. In particular, borax ($Na_2B_4O_7 \cdot 10H_2O$) is effective. The content of borax is in the range of 2 to 15% by weight.

Furthermore, a fusion point requlator may be added if necessary. Examples thereof are inorganic salts including $NaCl$, $KCl$, $NH_4Cl$, and $NaNO_3$. The amount of the regulator to be added is in the range of 0.2 to 1.0 mole per 1 mole of $Na_2SO_4$. With the regulator in an amount in this range, an intended fussion point can be obtained.

According to the present invention, there is provided, as described above, a heat storage composition which is effectively protected from the solid-liquid separation and markedly improved in stability. Thus, the invention much contributes to putting heat storage compositions into practical use.

The invention is illustrated in more detail with reference to the following example; however the invention is not limited by any of these examples. In the examples, "parts" are all by weight. The heat of fusion of heat storage compositions was measured as follows: A polyethylene pouch packed with 30 g of each specimen was put into 300 ml of warm water contained in a Dewar vessel. The change in the temperature of the water was measured to calculate the heat of fusion therefrom. The hardness was measured by placing a round rod with a weight of 500 gr. on the same specimen and determining the depth of the round rod penetrating into the specimen in 30 secs. When the depth is above 5 mm, the hardness is herein referred to as "bad", and when the depth is below 5 mm, the hardness is referred to as "good".

EXAMPLE 1

A viscous composition was obtained by stirring the following mixture at 30° C. for 130 minutes and adding 3 parts of borax to the mixture.
Anhydrous sodium sulfate: 31.60 parts
Water: 52.15 parts
Sodium chloride: 6.50 parts α-Hemihydrate gypsum (α-type of CaSO$_4$·½H$_2$O): 6.75 parts In one-day standing at about 30° C., the composition turned into a non-thixotropic solid without bleeding.

EXAMPLE 2

A viscous composition was obtained by stirring the following mixture at 35° C. for 80 minutes and adding 3 parts of borax.

Anhydrous sodium sulfate: 37.27 parts
Water: 57.03 parts
α-Hemihydrate gypsum (α-type of CaSO$_4$·½H$_2$O): 2.53 parts
Fine powder of silica (Tokusil®P, supplied by Tokuyama Soda Co., Ltd.): 3.0 parts In one-day standing at 35° C., the composition turned into a non-thixotropic solid without bleeding. The found heat of fusion of the composition was 49.6 Cal/g.

EXAMPLE 3

Similarly to Example 2, a viscous composition was obtained by stirring the following mixture for 80 minutes and adding 3 parts of borax.

Anhydrous sodium sulfate: 35.29 parts
Water: 54.97 parts
α-Hemihydrate gypsum (α-type of CaSO$_4$·½H$_2$O): 6.74 parts
Fine powder of silica (Tokusil®P, supplied by Tokuyama Soda Co., Ltd.): 3.0 parts After one-day standing, the composition showed a hardness higher than that of the composition of Example 2. The found heat of fusion of the composition was 43.7 Cal/g.

EXAMPLE 4

Similarly to Example 2, a viscous composition was obtained by stirring the following mixture for 80 minutes and adding 3 parts of borax.

Anhydrous sodium sulfate: 36.47 parts
Water: 56.30 parts
α-Hemihydrate gypsum (α-type of CaSO$_4$·½H$_2$O): 4.22 parts
Fine powder of silica (Tokusil®P, supplied by Tokuyama Soda Co., Ltd.): 3.0 parts After one-day standing, the composition was exposed to temperature cycles of 40° C.⇌10° C. 28 times, and the hardness, the state of bleeding and the heat of fusion were measured. Results thereof are shown in Table 1.

EXAMPLE 5

A viscous composition was obtained by stirring the following mixture at 25° C. for 80 minutes and adding 3 parts of borax.

Anhydrous sodium sulfate: 33.73 parts
Water: 52.12 parts
Sodium chloride: 6.94 parts
α-Hemihydrate gypsum (α-type of CaSO$_4$·½H$_2$O): 4.22 parts
Fine powder of silica (Tokusil®P, supplied by Tokuyama Soda Co., Ltd.): 3 parts In one-day standing at about 25° C., the composition turned into a non-thixotropic solid. It was exposed to temperature cycles of 35° C.⇌10° C. 28 times, and the hardness, the state of bleeding, and the heat of fusion were measured. Results thereof are shown in Table 1.

EXAMPLE 6

A composition was prepared in the same manner from the same material mixture as in Example 5, except that Aerosil®200 (supplied by Nippon Aerosil Co., Ltd.) was substituted for the fine powder of silica. The composition showed a sufficient hardness and no bleeding.

The composition was exposed to temperature cycles of 35° C.⇌10° C. 28 times, and the hardness, the state of bleeding, and the heat of fusion were measured. Results thereof are shown in Table 1.

EXAMPLE 7

A composition was prepared by adding 30.15 parts of anhydrous sodium sulfate to 43.64 parts of a 1.54 wt% concentration of sulfuric acid with stirring at about 30° C., gradually adding 10.20 parts of a 1:1 (weight ratio) water glass No. 3-water mixture, further adding 6.40 parts of sodium chloride and 6.55 parts of α-hemihydrate gypsum (α-type of CaSO$_4$·½H$_2$O), stirring the mixture for 20 minutes, adding then 3 parts of borax, and continuing stirring further for 60 minutes. In one-day standing at about 30° C., the composition was solidified without bleeding.

COMPARATIVE EXAMPLE 1

In accordance with the same procedures as in Example 4, a composition was prepared from the following mixture.

Anhydrous sodium sulfate: 42.76 parts
Water: 54.23 parts
Fine powder of silica (Aerosil®200, supplied by Nippon Aerosil Co., Ltd.): 7.0 parts
Borax: 3.0 parts The composition was exposed to temperature cycles of 40° C.⇌10° C. 12 times, and the hardness, the state of bleeding, and the heat of fusion were measured. Results thereof are shown in Table 1.

TABLE 1

|  | Before temperature cycle test | | | After temperature cycle test | | |
| --- | --- | --- | --- | --- | --- | --- |
|  | Hardness | Bleeding | Heat of fusion (Cal/g) | Hardness | Bleeding | Heat of fusion (Cal/g) |
| Example 4 | Good | None | 45.5 | Good | None | 43.9 |
| Example 5 | Good | None | 33.5 | Good | None | 31.1 |
| Example 6 | Good | None | 33.9 | Good | None | 31.5 |
| Comparative Example 1 | Good | None | 49.7 | Bad | Ca. 10 vol % | 37.4 |

EXAMPLE 8

A viscous composition was obtained by stirring the following mixture at 35° C. for 60 minutes.

Anhydrous sodium sulfate: 300.0 parts
Water: 483.3 parts
Sodium chloride: 61.7 parts
Synthetic gypsum (CaSO$_4$·2H$_2$O): 40.0 parts
Borax: 30.0 parts
Fine powder of silica (Aerosil®200, supplied by Nippon Aerosil Co., Ltd.): 20.0 parts After one-day standing, the composition was exposed to temperature cycles of 40° C.⇌10° C. 48 times. The results showed neither the appearance of bleeding nor the sedimentation of anhydrous sodium sulfate.

EXAMPLE 9

A viscous composition was obtained by stirring the following mixture at 35° C. for 50 minutes.
 Anhydrous sodium sulfate: 36.37 parts
 Water: 46.14 parts
 Sodium chloride: 7.48 parts
 Synthetic gypsum ($CaSO_4 \cdot 2H_2O$): 7.00 parts
 Borax: 3.00 parts In one-day standing at about 30° C., the composition turned into a non-thixotropic solid. It was exposed to temperature cycles of 40° C.$\rightleftarrows$10° C. 78 times, and the hardness, the state of bleeding, and the heat of fusion were measured. Results thereof are shown in Table 2.

EXAMPLE 10

A viscous composition was obtained by stirring the following mixture at 35° C. for 40 minutes.
 Anhydrous sodium sulfate: 35.56 parts
 Water: 45.12 parts
 Sodium chloride: 7.32 parts
 Synthetic gypsum ($CaSO_4 \cdot 2H_2O$): 9.00 parts
 Borax: 3.00 parts In one-day standing at about 30° C., the composition turned into a non-thixotropic solid. It was exposed to temperature cycles of 40° C.$\rightleftarrows$10° C. 78 times, and the hardness, the state of bleeding, and the heat of fusion were measured. Results thereof are shown in Table 2.

EXAMPLE 11

A viscous composition was obtained by stirring the following mixture at 35° C. for 50 minutes.
 Anhydrous sodium sulfate: 39.67 parts
 Water: 50.33 parts
 Synthetic gypsum ($CaSO_4 \cdot 2H_2O$): 7.00 parts
 Borax: 3.00 parts In one-day standing at about 30° C., the composition turned into a non-thixotropic solid. It was exposed to temperatures cycles of 40° C.$\rightleftarrows$10° C. 78 times, and the hardness, the state of bleeding, and the change in the heat of fusion were measured. Results thereof are shown in Table 2.

COMPARATIVE EXAMPLE 2

Similarly to Examples 9, a composition was prepared from the following mixture.
 Anhydrous sodium sulfate: 38.80 parts
 Water: 49.22 parts
 Sodium chloride: 7.98 parts
 Synthetic gypsum ($CaSO_4 \cdot 2H_2O$): 1.00 part
 Borax: 3.00 parts The composition was exposed to temperature cycles of 40° C.$\rightleftarrows$10° C. 78 times, and the hardness, the state of bleeding and the heat of fusion were measured. Results thereof are shown in Table 2.

TABLE 2

| | Before temperature cycle test | | | After temperature cycle test | | |
|---|---|---|---|---|---|---|
| | Hardness | Bleeding | Heat of fusion (Cal/g) | Hardness | Bleeding | Heat of fusion (Cal/g) |
| Example 9 | Good | None | 30 | Good | None | 30 |
| Example 10 | Good | None | 27 | Good | None | 27 |
| Example 11 | Good | None | 48 | Good | None | 48 |
| Comparative Example 2 | Bad | 5 vol % | 38 | Bad | 20 vol % | 31 |

What is claimed is:

1. A heat storage composition, consisting essentially of 2–15% by weight of a supercooling inhibitor, 2–15% by weight of calcium sulfate as a solid-liquid separation inhibitor, 0.2–1.0% by mole of the sodium sulfate of a fusion point regulator, 0.5–10% by weight of a thickener and the balance of sodium sulfate decahydrate as a main component.

2. The heat storage composition of claim 1, wherein the calcium sulfate is hydraulic calcium sulfate and/or calcium sulfate dihydrate.

3. The heat storage composition of claim 1, wherein borax is contained as the supercooling inhibitor in an amount of 2–15% by weight based on the whole weight of the composition.

4. The heat storage composition of claim 1, which contains as a thickener (a) a fine powder of amorphous silica in an amount of 0.5–10% by weight or (b) polysilicic acid in an amount of 0.5–10% by weight in terms of $SiO_2$.

* * * * *